US009313758B2

(12) United States Patent
Krone et al.

(10) Patent No.: US 9,313,758 B2
(45) Date of Patent: Apr. 12, 2016

(54) METHOD FOR REDUCED RESOURCE USAGE IN SYSTEM SYNCHRONIZATION, DATA DELIVERY AND ASYNCHRONOUS REAL-TIME ACCESS MOBILE COMMUNICATIONS SYSTEMS WITH MULTIPLE LOW COMPLEXITY TERMINALS

(75) Inventors: Stefan Krone, Dresden (DE); Gerhard Fettweis, Dresden (DE); Walter Nitzold, Dresden (DE)

(73) Assignee: Vodafone Holding GmbH, Dusseldorf (DE)

( * ) Notice: Subject to any disclaimer, the term of this patent is extended or adjusted under 35 U.S.C. 154(b) by 306 days.

(21) Appl. No.: 13/565,029

(22) Filed: Aug. 2, 2012

(65) Prior Publication Data

US 2013/0034037 A1    Feb. 7, 2013

(30) Foreign Application Priority Data

Aug. 2, 2011 (EP) ..................................... 11176361

(51) Int. Cl.
*H04W 56/00* (2009.01)
*H04W 72/04* (2009.01)
*H04W 74/08* (2009.01)

(52) U.S. Cl.
CPC ............ *H04W 56/004* (2013.01); *H04W 72/04* (2013.01); *H04W 74/08* (2013.01)

(58) Field of Classification Search
CPC .............................. H04B 1/7117; H04B 3/232
USPC ................................................... 370/328–331
See application file for complete search history.

(56) References Cited

U.S. PATENT DOCUMENTS

| | | | | |
|---|---|---|---|---|
| 5,740,166 | A  * | 4/1998 | Ekemark et al. ............... | 370/331 |
| 2009/0180443 | A1* | 7/2009 | Kawasaki et al. ............... | 370/331 |
| 2009/0290555 | A1* | 11/2009 | Alpert et al. ................... | 370/331 |
| 2010/0172299 | A1* | 7/2010 | Fischer et al. ................. | 370/328 |
| 2010/0195607 | A1* | 8/2010 | Lee et al. ....................... | 370/329 |
| 2010/0238872 | A1* | 9/2010 | Kim et al. ...................... | 370/329 |
| 2012/0008590 | A1* | 1/2012 | Novak et al. ................... | 370/330 |

* cited by examiner

*Primary Examiner* — Jung Park
*Assistant Examiner* — Chuong M Nguyen
(74) *Attorney, Agent, or Firm* — Mintz Levin Cohn Ferris Glovsky and Popeo, P.C.; Peter F. Corless; Steven M. Jensen

(57) ABSTRACT

A radio communication method and a corresponding system are described. Time frequency resources are divided into a grid of resources. For communicating with a plurality of non-synchronized terminals the timing offset of each terminal is measured and a joint message is asynchronously transmitted to a subset of terminals, wherein the subset comprises at least two terminals.

14 Claims, 4 Drawing Sheets

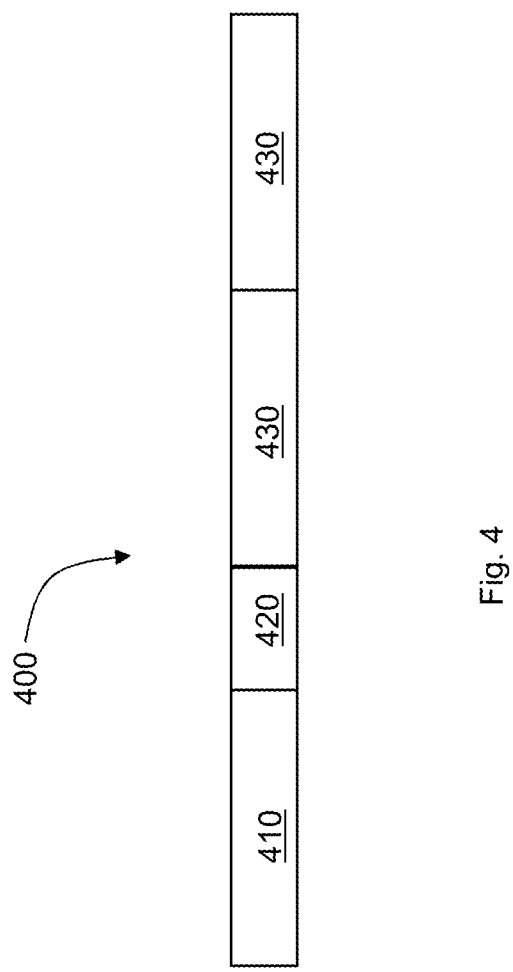

METHOD FOR REDUCED RESOURCE USAGE IN SYSTEM SYNCHRONIZATION, DATA DELIVERY AND ASYNCHRONOUS REAL-TIME ACCESS MOBILE COMMUNICATIONS SYSTEMS WITH MULTIPLE LOW COMPLEXITY TERMINALS

CROSS-REFERENCES TO RELATED APPLICATIONS

This application claims under 35 U.S.C. §119(a) the benefit of European Patent Application No. 11176361.1 filed Aug. 2, 2011 the entire contents of which is incorporated herein by reference.

The invention relates to a method and a corresponding system for reduced resource usage in synchronization and asynchronous real-time access in a mobile communications system.

Traditional mobile communication systems typically comprise a cellular network and mobile terminals. On the wired network side the cellular network typically is coupled to the fixed-line telephone system and the internet to connect the mobile terminals to the conventional fixed-line telephone system, the so-called plain old telephone system POTS, and the internet. On the other side, i.e. the air interface side, the cellular network provides an air interface, i.e. a radio interface, in order to connect to mobile terminals via a radio link.

In the following cell phones or personal digital assistants (PDAs) or the like, which typically are called cell phones or mobile stations or mobile nodes or user equipment (UE) in the prior art, are called mobile terminals, since they share the property of being coupled to the communications system via the radio interface and are mobile. In contrast thereto fixed communication stations implementing the air interface, i.e. the radio link, from the network system to mobile terminals, and which for example are called base stations in a GSM system or eNodeBs in the LTE terminology are called base stations in the following.

Most of these traditional mobile communication systems, for example systems according to the GSM standard or systems according to the LTE specification, employ time slotted communication protocols for exchanging information. In these systems a resource, i.e. for example a particular frequency band within a cell, is divided into a plurality of time slots, short slots. A time slot is the smallest individual period of time dedicated to transmit to or receive information from a terminal. These systems are known as time division multiple access (TDMA) systems. A time slot for example can be assigned to a particular mobile terminal and specifies a time span of predefined duration, in which the base station may transmit data to or receive data from that particular mobile terminal, wherein the conveyed data may be arbitrary. For example, when a telephone call to or from a mobile terminal is established, a base station may assign one time slot in a frame of slots for transmitting data from a base station to the mobile terminal, i.e. downlink, using a first frequency band and one time slot of a frame in a second, different frequency band for receiving data from the mobile terminal at the base station, i.e. uplink. The mobile terminal accordingly has to listen to the dedicated downlink frequency exactly during the assigned time slot to receive data related to the established telephone call. Conversely the mobile terminal must use exactly the assigned time slot to transmit data to the base station.

Alternatively and instead of being assigned to only one terminal for communication, a time slot of a particular frequency can be used to broadcast information to a plurality of terminals.

In any case each mobile terminal comprises its own clock generator having an individual timing uncertainty and deviation from a preset clock. As a consequence over a long period of time the clock signal generated in the mobile terminal will deviate from the clock signal generated in the base station.

In order to match the assigned time slots exactly the mobile terminal must be synchronized in time with its assigned base station at least when transmitting data to or receiving data from a base station. Typically the base station defines the master clock, to which each mobile terminal, which communicates with that base station, is synchronized in time. Accordingly, each mobile communication system provides means and procedures to individually synchronize mobile terminals to a base station. For example in the GSM system coarse timing information is provided to a terminal when that terminal initially enters a cell, for example when the terminal scans for the synchronization channel, so-called SCH. When actually transmitting payload data, for example when transmitting from a terminal to a base station, fine timing information is provided to the terminal by providing timing advance information to the terminal to compensate for the propagation delay. A base station for example may calculate the timing advance based on the synchronization sequence transmitted within an access burst message from a terminal. In this way the timing of each terminal assigned to a base station is handled individually.

Similarly the LTE specification provides timing advance information to a terminal. When a terminal, i.e. User Equipment UE as it is called in the LTE terminology, wishes to establish a connection to a base station, i.e. a so-called eNodeB, it transmits a random access preamble to the base station. The base station in turn estimates the transmission timing of the terminal and transmits a response message comprising a timing advance command. Based on that command the terminal, i.e. UE, adjusts its transmission timing.

An increasing number of terminals communicating with a base station consequently produces a linear increasing amount of timing messages and correspondingly an increasing calculation effort in the base station. These timing messages do not convey any payload data, i.e. actually these messages are protocol overhead, but consume valuable resources.

This problem of increased overhead messages has advanced since in mobile communication systems a considerable amount of so-called machine-to-machine terminals are used. Hence there is a need to integrate these machine terminals into the wireless communication system.

BRIEF DESCRIPTION OF THE FIGURES

In the following the proposed method and system are described in more detail with reference to the following figures, wherein

FIG. 4 depicts a schematic of a timing update multicast message.

FIG. 1 depicts a mobile communication system 100 comprising a plurality of communication cells 110, denoted as 110a to 110e. The area of each cell is determined as the area covered by the at least one base station 120 comprised in the cell. Note that in the following the term base station shall be the generic term for a radio access station as known for example from the GSM specification or in LTE terminology an eNodeB, which provides the air interface to the radio terminals. The area of each cell is defined by the area covered by the at least one base station 120 comprised and located somewhere in the cell.

Figure 1:
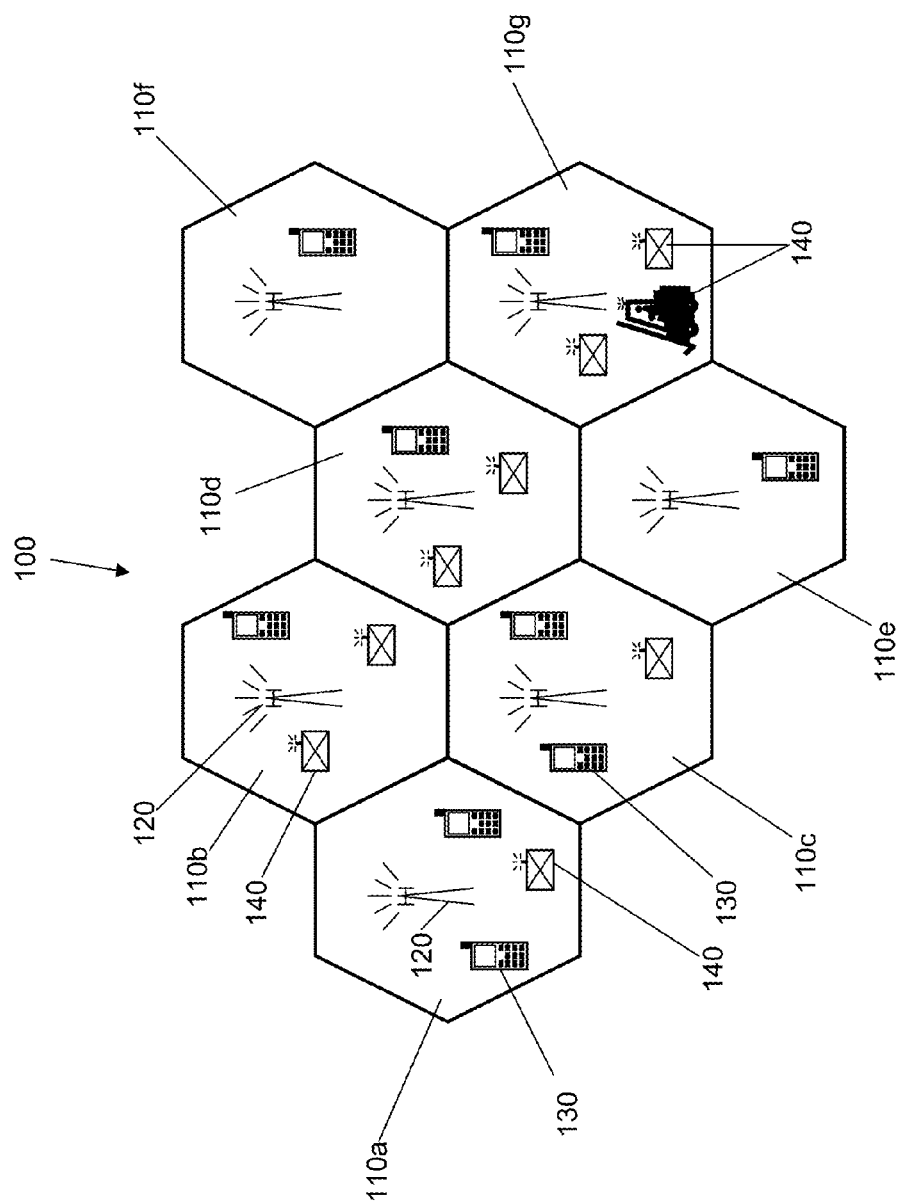
FIG. 1 depicts a schematic illustrating a mobile communication system.

Mobile stations 130 are communicatively connected by a radio link to the base station of a cell. A mobile station 130 can be a cell phone or PDA or a laptop computer, which is adapted and configured to exchange data using the mobile communication system. Typically mobile stations 130 are interactive and provide an interface for being operated by a person, thus typically providing a display and a keyboard or a so-called touch-screen. Typically data is transmitted and received when initiated by the operating user or, for example upon an incoming telephone call, when initiated by another person. In this way mobile stations typically are used to exchange data between two communicating persons.

Furthermore communication devices 140 may use mobile communication system 100 via a radio link to base station 120. Typically these terminals are not interactive, i.e. there is no person operating these terminals and in this way initiating any data exchange. Instead terminals 140 typically are devices for so-called machine-to-machine communication, i.e. communication between two machine devices, wherein a data transmission is not initiated by a user interaction. A terminal may act as an autonomous device according to a predefined schedule that specifies communication actions. Alternatively a terminal may communicate as a reaction to a predefined event, for example when requested by another machine. Furthermore these terminals can be endpoints in a communication chain, i.e. a device does not receive data from a first station and forwards that data to a third station thus acting as a relay station. In the following these devices are called terminals 140.

In one embodiment a machine terminal 140 may be a gauging station comprising a sensor. The sensor for example may sense any data of its surroundings, such as climate or weather or traffic data or any other arbitrary information. A gauging station may collect information over a predefined time period or may collect data at any one moment in time. In one example the gauging station may produce the data upon request, i.e. when a request message is received and just before the requested information is transmitted to a central server station, which processes the transmitted data. So in one example these machine terminals 140 serve as a data source generating data reflecting arbitrary information, which the device generates for example by measurements.

In an alternative embodiment a machine terminal 140 may be coupled to or may form an integral part of a bigger machine, wherein the machine terminal may be adapted and configured for receiving or transmitting information related to the bigger machine. In this embodiment the machine terminal may be adapted for receiving instructions to control the bigger machine or for transmitting information indicating the status of the bigger machine, for example when raising an alarm.

A plurality of mobile communication system architectures is known, for example the GSM system or future systems like LTE. These systems have in common that they use a time-slotted system for allocating frequency resources. The GSM system for example uses a time divisional multiplexing system, wherein an available frequency band is divided into short periods of time, so-called time slots, and eight consecutive time-slots of the same frequency band form a so-called frame.

Furthermore an available frequency range is divided into a plurality of parallel frequency bands. A time-slot or typically a series of time-slots in consecutive frames is allocated for communicating with one mobile station. The mobile station may then use the allocated time-slot of a frame to transmit information, i.e. uplink, to a base station. Likewise, for transmitting information from a base station to a mobile station, i.e. downlink, a time-slot is allocated in a frame of another frequency band.

In LTE frequency resources over time are also divided into a grid of resource units, wherein a resource unit is defined by a predefined duration and a predefined bandwidth. Albeit the term resource unit is more known from the LTE specification, it is used in the following as a generic term to describe a resource element of a predefined duration and predefined bandwidth without limiting the invention to LTE. Although the allocation of resources to a terminal in LTE differs significantly from the allocation of resources in GSM, the systems share the common property that bandwidth resources are allocated in time slots. A transmitter, i.e. a base station or a terminal, must adhere to the allocation of time slots. Otherwise, i.e. if a transmitter would transmit too early or too late, i.e. before or after an allocated time slot that transmission would interfere with another transmission transmitted by another station the time slot before or after that allocated slot. Time-slotted systems accordingly ensure that each mobile station starts to transmit at a point in time minimizing the interference caused by early or late transmissions, which at a base station interfere with transmissions of neighbouring time slots. In conventional time-slotted systems this is achieved by coarsely synchronizing a mobile station in time using so-called synchronization channels and by fine tuning each mobile station individually by transmitting so-called timing advance information to the station. Basically said timing advance information instructs a station when to start its transmission dedicated for an allocated time slot in order to ensure that said transmission arrives at the base station within the allocated time slot.

Conventional radio communication systems in this way may calculate and transmit individual timing advance information for fine tuning the timing of a mobile station to reduce interference. This in turn wastes precious frequency-time resources.

Figure 2:
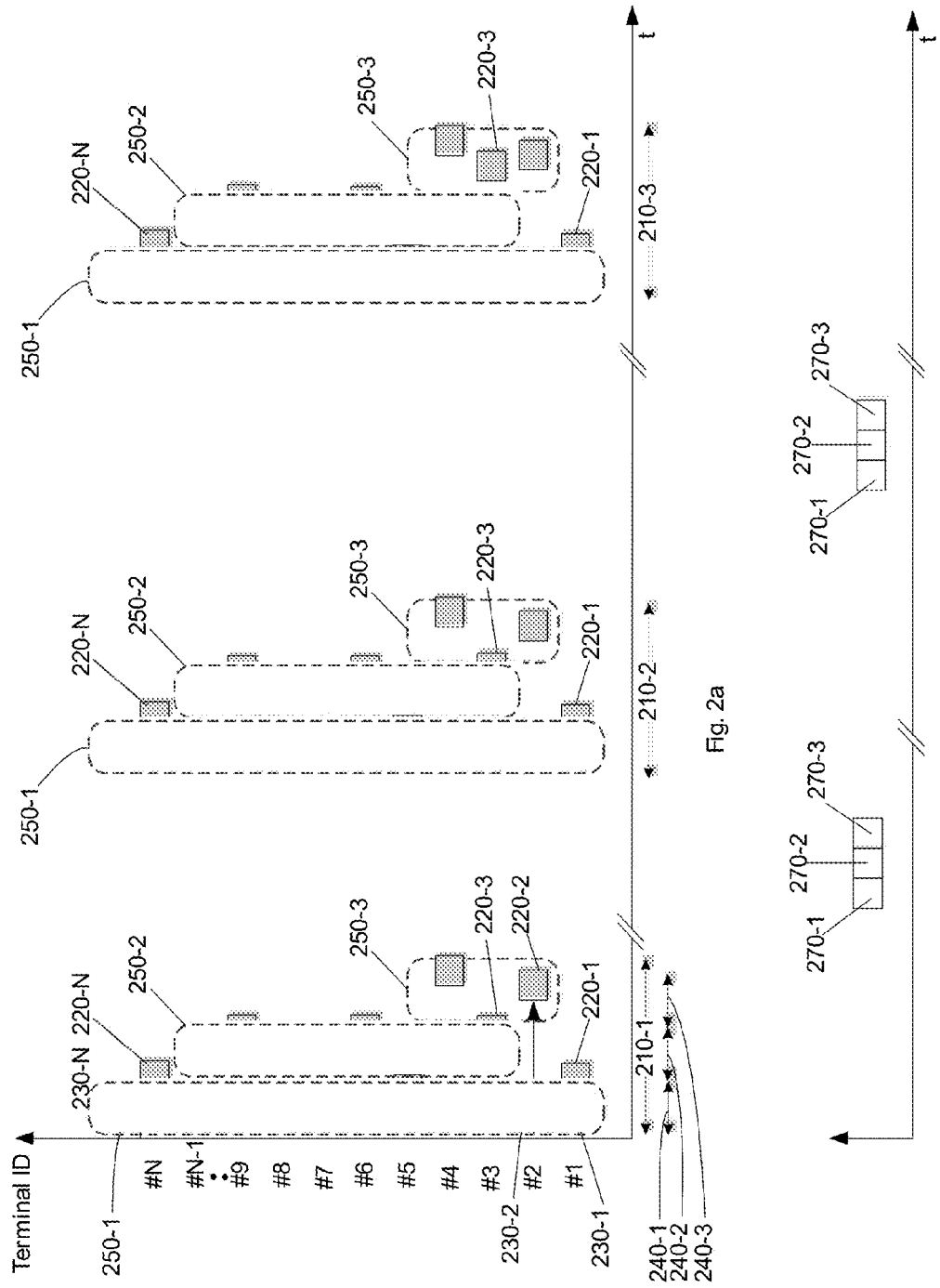
FIG. 2 depicts a timing diagram of uplink messages.

FIG. 2 depicts a schematic of a resource grid of a cellular communication system.

For scheduling communication with machine terminals 140 the base station partitions from the plurality of terminals 140 at least one subset of terminals, said subset comprising at least two individual terminals. Thereafter the base station transmits scheduling information to said subset of terminals using a multicast message, i.e. one message that is received and processed by all terminals of the addressed subset.

FIG. 2a illustrates the allocation of time spans for receiving messages from terminals 140. In the figure the abscissa depicts time and the ordinate depicts an arbitrary numbering of terminals 140, which is used here for distinguishing terminals. Messages are shown as squares to illustrate the start and end time of the reception of a message at the base station.

Each of the N terminals transmits its respective message 220-1-220-N at the scheduled time and at the scheduled frequency. However, the terminals are only roughly or not at all synchronized in time to the clock of the base station. In addition, due to the low complexity, i.e. simple and low-cost hardware, the terminals may be not accurately synchronized in frequency, i.e. a terminal will differ from a scheduled frequency. Accordingly each terminal transmits its message asynchronously in time and/or asynchronously in frequency to the base station. To receive a scheduled message from a machine terminal, the base station allocates a predefined time span at a predefined frequency bandwidth for the reception of each message; that is the base station may allocate a bandwidth for a time span for receiving messages from the machine terminals. These uplink messages may be received at any time within the allocated time span and at any frequency in the allocated bandwidth. In the allocated time span the base station may allocate different frequency bands each exhibiting a particular bandwidth, wherein said bandwidth may extend over a plurality of resource units. Terminals accordingly may be configured and adapted to transmit their respective message on these frequencies.

Each terminal 140 may transmit its message 220-1-220-N, i.e. uplink, as a single burst within the scheduled time span 210, i.e. messages are not divided into a plurality of packets being transmitted separately. Furthermore each terminal may transmit its message on a single carrier frequency, i.e. the terminal may not use any frequency hopping when transmitting its message.

To allow a successful reception of a plurality of messages at the base station from the terminals, the system ensures that the messages are orthogonal to each other at the base station and to the communication of the base station with mobile stations 130.

In one embodiment each terminal 140 is allotted a different frequency for transmitting. In one embodiment the frequency may be fixed and may be adjusted upon installation of the respective terminal. In an alternative embodiment the frequency for uplink transmission can be communicated in a downlink message from the base station to the respective terminal and can be adjusted dynamically. In still another embodiment a terminal may vary the frequency for transmitting uplink messages as instructed by a base station or according to a predefined schedule. The base station accordingly allocates time slots in each of the different frequencies to receive the transmissions from the terminals, wherein it is assumed that the base station is aware of any changes in frequency for uplink messages from a terminal and thus can follow these changes. In this way the transmissions from the plurality of terminals are separated in frequency and thus do not interfere each other at the base station.

In an alternative embodiment the terminals may transmit the messages to the base station on the same frequency but at different times. The base station accordingly may allocate different time spans using said same frequency. In one embodiment the individual time, at which a terminal transmits a message uplink, may be fixed and can be adjusted upon installation of the respective terminal. In an alternative embodiment the individual transmission time may be communicated in a downlink message from the base station, wherein in one embodiment the downlink message may specify a time span specifying the time span to the next uplink transmission referencing either the last uplink transmission or the time of the downlink message. In still another embodiment the transmission time may be varied according to a predefined time schedule. In this way the uplink transmissions from the terminals are separated in time. It is assumed that the base station is aware of the respective fixed or varying transmission time and accordingly allocates corresponding time spans for receiving the uplink messages.

In still another embodiment the terminals may transmit the messages on the same frequency and at the same time, but wherein the terminals use a code division separation, i.e. a so-called CDMA transmission method, wherein individual messages from the terminals are separated by orthogonal spreading codes. As explicated above for the adjusting and varying a transmission time or frequency, a spreading code can fixed and may be initialized upon installation of a terminal or may be varied as communicated by the base station or according to a predefined time schedule. The base station may accordingly allocate one frequency for one time span for simultaneous reception of a plurality of code-orthogonal uplink messages, wherein it is assumed that the base station is aware of the CDMA coding scheme used by the terminals.

For illustration purposes and without restriction the transmissions of the terminals are separated in frequency, i.e. each terminal is allotted and uses a different frequency for uplink transmissions.

For determining a timing offset of machine terminal #1 it is assumed that the base station expects a scheduled uplink message 220-1 from said machine terminal #1 in an allocated and predefined time span 210-1. Time span 210-1 may extend a plurality of resource units consecutive in time. Furthermore the base station may allocate a bandwidth exceeding the bandwidth of one resource unit, i.e. the base station may allocate a plurality of resource units consecutive in time and adjacent in frequency.

The timing offset of machine terminal #1 is the time span from the beginning of allocated time span 210-1 to the beginning of reception of message 220-1, thus the timing offset of a machine terminal is relative to the beginning of the allocated time span 210-1. In the figure the timing offset of machine terminal #1 is illustrated as arrow 230-1. Since the base station is aware of the beginning of time span 210-1 and also detects the point in time when receiving the expected message 220-1 from machine terminal #1, the base station may measure the timing offset of machine terminal #1.

Similarly the base station may measure the individual timing offset of a plurality of other terminals.

As illustrated in the figure machine terminals #1 to #N may have different timing offsets 230-1 to 230-N, which for example may result from varying oscillator offsets or different propagation delays. In this way the base station may measure the individual timing offset 230 of each of the plurality of machine terminals 140.

Then a subset 250-1 of at least two terminals may be determined, wherein said terminals have a timing offset within the same predefined range 240-1. Said determination can be performed by the base station or another element of the fixed radio network. To determine the terminals having a timing offset within a predefined range of timing offset the base station may compare the determined timing offset 230 of a terminal to a predetermined first range of timing offset 240-1, which begins at the beginning of time span 210 but is significantly shorter. In FIG. 2A terminals #1, #5, #8 and #N share the common property of having a timing offset shorter within timing offset interval, i.e. timing offset range 240-1. These terminals accordingly may form the first subset 250-1.

In one embodiment a predefined range of timing offset may exceed the duration of one resource block, but is shorter than the duration of two resource blocks. In an alternative embodiment a timing offset range may exceed the duration of two resource units. Basically a range of allowed timing offsets can be predefined by a system operator and may be set arbitrarily. However, in case terminals are configured to receive messages depending on a preceding transmission, an allowed timing offset may be limited to ensure that a downlink transmission, i.e. from the base station to the terminals is completed within the time span scheduled at the terminal.

Optionally a second subset 250-2 of at least two terminals may be determined, wherein the terminals of said second subset of machine terminals share the property of having a timing offset of a range greater than that defined for the first subset of terminals but shorter than a predetermined second timing offset interval 240-2. Machine terminals #3, #6, #7, #9 and #N−1 in this embodiment form said second subset 250-2 of terminals.

Similarly a third subset 250-3 of terminals having an offset in a third range as depicted by arrow 240-3 can be determined. In the drawing terminals #2 and #4 form said third subset.

Note that the number of timing offset ranges and corresponding subsets of terminals may be arbitrarily chosen. Also the duration of an interval 240, which defines a timing offset range, may be suitably chosen to partition the plurality of machine terminals into useful subsets.

As described above for asynchronism in time, the base station may similarly measure and evaluate asynchronism in frequency in addition or alternatively to asynchronism in time. Accordingly the base station may measure a frequency offset of a received uplink message as a difference between a frequency scheduled for that transmission and the frequency of the actually received message. Similarly individual frequency offsets of a plurality of received uplink messages can be measured. The individual offset of a received message can be used as an additional or an alternative criterion to the above described timing offset. Accordingly the base station may determine subsets of at least two terminals having the same frequency offset, i.e. the frequency offset of that subset being within the same range, wherein the frequency offset range may extend the bandwidth of one resource unit.

FIG. 2*b* illustrates downlink communication between the base station and the terminals, i.e. messages transmitted from the base station to the subsets of terminals. Similar as for uplink messages, a downlink message may be transmitted as a single burst, i.e. a downlink message is not divided into a plurality of packets being transmitted separately.

The base station may transmit a first multicast message 270-1 to the first subset 250-1 of terminals, wherein it is assumed that the terminals of said subset expect to receive a message within a scheduled time span and on an agreed frequency. Since the scheduled time span of a terminal is not totally fixed but slowly slides according to the timing offset of the respective terminal, and the base station has determined the timing offset of that terminal, i.e. of the subset of terminals having essentially the same timing offset, the base station may transmit a joint message 270-1 to the subset of terminals at the point in time that enables the terminals of said subset to successfully receive said message. The transmission of said multicast message from the base station to a subset of terminals accordingly may be asynchronous to the communication with mobile stations 130, i.e. the resource grid allocated for communication with mobile stations 130. However, the transmission is adapted to the timing offset of said subset of terminals.

Since the down- and the uplink messages to and from the terminals may be transmitted asynchronously to the communication of the base station with mobile stations, the communication between the base station and the machine terminals can be asynchronous to the communication between said base station and the mobile stations 130 logged in to said base station.

Multicast message 270-1 for example may comprise timing information for instructing each terminal when to transmit the next uplink message to the base station. The instruction may specify a time span, which specifies the time span from the last uplink transmission to the next uplink transmission. In this way both the base station and each of the terminals of the addressed subset of terminals know the schedule for the next uplink transmission. In one embodiment the timing information may specify a comparatively short and recurring time interval between successive uplink messages to the base station. In one embodiment the allocated resources for an uplink may be recur once in a second or once in two seconds. Terminals may use the allocated resources if necessary, i.e. for example for alarming in case of a detected emergency, but are not required to transmit any dummy message. In this way the system can provide a real-time or quasi real time access.

Similarly multicast messages 270-2 and 270-3 may be sent to subsets 250-2 and 250-3 of machine terminals. The transmission of messages 270-1 to 270-3 may be performed using the same frequency, i.e. the transmission of these uplink messages may be performed sequentially.

In addition or alternatively the multicast message may specify frequency information for instructing each terminal what frequency to use for transmitting the next uplink message, so both the base station and each terminal of the addressed subset of terminals know the frequency of the next uplink transmission.

Referring again to FIG. 2*a* terminals #1 to #N subsequently may each transmit another message to the base station during time span 210-2, wherein the time between time spans 210-1 and 210-2 may be that as specified in the uplink messages 270-1 to 270-3. As described above the base station may measure again the timing and/or frequency offset of each terminal. Based on the measured individual timing and/or frequency offsets of the terminals the base station may again partition at least one subset of terminals from the plurality of transmitting terminals. As illustrated in FIG. 2*b* the base station may then send another multicast message to a subset of terminals. The terminals may transmit individual messages to the base stations, which in turn may again measure the individual timing offset of each terminal.

Note that due to a variety of reasons the timing and/or frequency offset of a terminal may vary from transmission to transmission as illustrated in FIG. 2*a* for terminal #3. According to its increased timing offset, terminal #3, which had been member of the second subset 250-1 is considered then as a member of subset 250-3. In this way the measuring of the timing and/or frequency offset each time a terminal transmits a message to the base station accounts for variations in the timing and/or frequency offset of an individual terminal.

For transmitting messages 220 to a base station a terminal 140 may use any arbitrary transmission method agreed with the base station. Accordingly, to ensure a working communication with the base station, the base station must be compatible to the transmission protocol used by the terminals. Said protocol may be incompatible with the transmission protocol used agreed between the base station and the mobile stations 130. To keep the terminals as simple as possible, a single-carrier transmission scheme and a simple modulation scheme may be used by the terminals 130.

In this way the mobile communication system may be configured and adapted for communicating with machine terminals 140, wherein excessive control messages for synchronizing the terminals in time with the base station are avoided.

Besides the range of timing and/or frequency offset the partitioning of the plurality of terminals may be based on additional criteria.

In one embodiment the partitioning of a subset of terminals can be based on the identified described range of timing and/or frequency offset and in addition thereto on the periodicity of transmissions from a terminal. For example when terminals shall report information one time per hour the partitioned subset may comprise these terminals only. Accordingly a single multicast message transmitted to that subset of terminals accordingly may inform all terminals about the scheduling of each next individual transmission.

In another embodiment the partitioning of a subset of terminals can be additionally based on the ability of a terminal to stay synchronized to the time scale of the base station, i.e. to maintain an offset without essentially further deviating from that. Terminals having a clocking that deviates over time essentially need timing update more often than terminals having an accurate clocking. Accordingly, since some terminals may have the capability of maintaining the clocking accurate for long time, messages from the base station to these terminals to set the clocking of the terminals can be less frequently. Vice versa terminals having a less precise but more inaccurate clocking need clock setting update messages more often to keep the timing offset of a terminal within an allowed range.

In one embodiment terminals 130 may receive and process a synchronization channel on a regular basis to maintain the timing offset as small as possible. In alternative embodiments the terminals may depend entirely on an individual internal clocking. These internal clockings may deviate from each other and from the clocking of the base station for various well-known reasons. Consequently timings between a terminal and the base station may thus deviate, i.e. the communication between a terminal and a base station is not synchronized as with mobile stations 130. So depending on the precision of the internal clocking of a terminal timing offsets may more or less vary.

Although it depends on the duration of time span 210, which is allocated by a base station for receiving a message from a terminal, it is necessary to regularly send timing update messages to a terminal to ensure that the uplink message from that terminal can be received within the allocated time span 210. To minimize the number of timing update messages while at the same time providing sufficient timing update messages to a terminal to ensure a timing offset within a maximum range, i.e. the duration of time span 210, the partitioning of the plurality of terminals may be further based on the ability of a terminal to maintain a timing offset constant.

Also the partitioning of a subset can be additionally based on the movements of a terminal. Since transmissions from terminals located farther away from a base station need more time than transmissions from terminals located close to the base station, variations in the location of a terminal affect the delay of a transmission. For example when a terminal increases its radial distance to a base station, the transmission delay will increase since the radio signal must travel the longer distance. Contrariwise, when a terminal radially moves towards the base station between two transmissions, the timing offset will decrease when compared to a transmission of said terminal being locally fixed. To compensate for a varying timing offset according to this effect, the base station may take the movements of a terminal into account when assessing a next time span 210 for receiving an uplink transmission. Accordingly the base station may size a time span for receiving a message dependent on the capabilities of a terminal, i.e. the base station assess a longer time span for receiving a message from a terminal having the capability to move and a shorter time span for receiving a message from a locally fixed base station.

In a further method step the base station may track and record the movements of a terminal for a duration covering a plurality of uplink transmissions. The base station may then generate a movement profile of the terminal based on the tracked movements of a terminal. The movement profile can be evaluated to discover the maximum distance of the movements radial to the base station and then estimate the variation of transmission delay based on the difference between the maximum and the minimum radial distance of the terminal.

Figure 3:
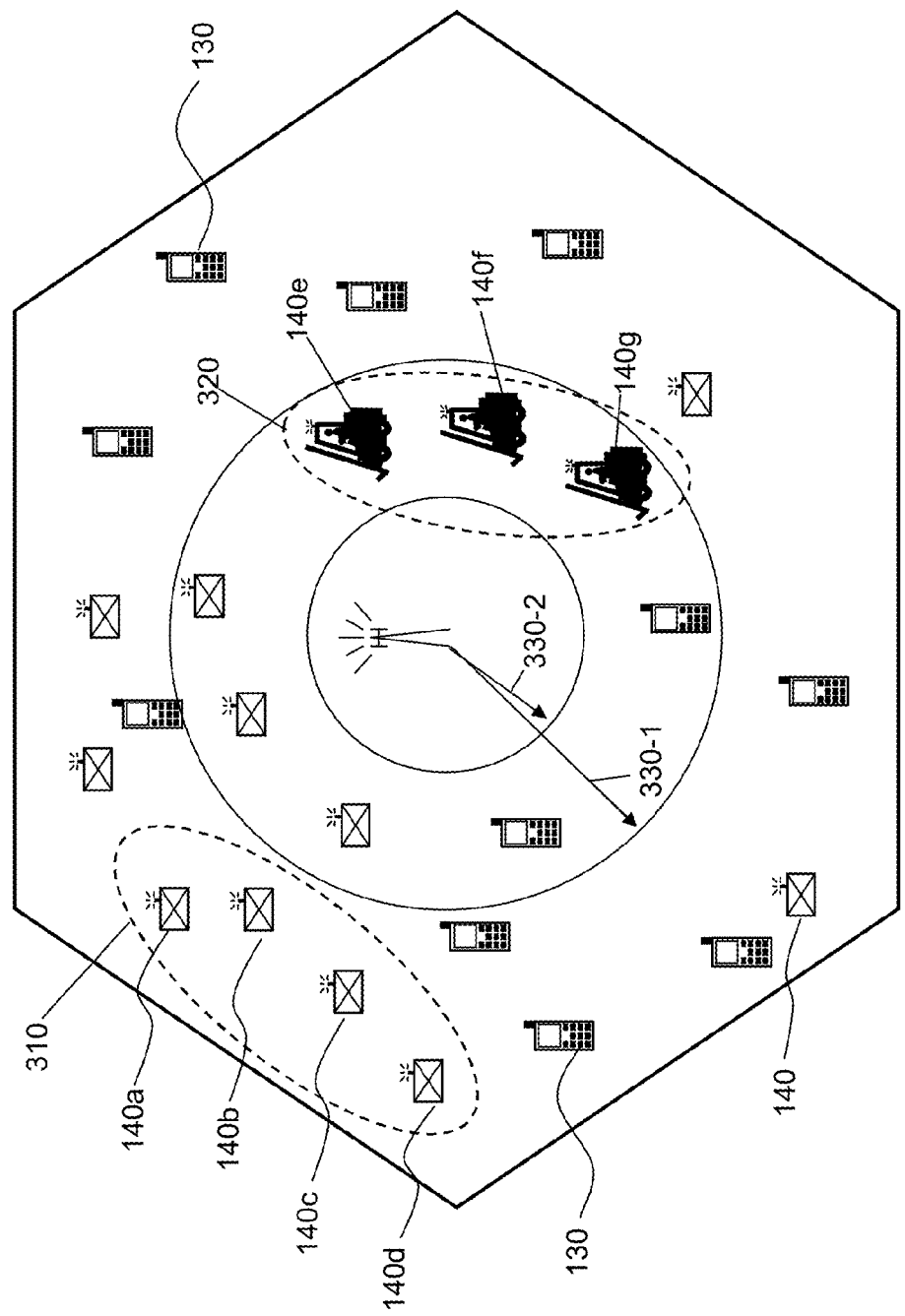
FIG. 3 depicts a schematic illustrating one cell of cellular communication system.

FIG. 3 depicts a single cell 110 of a cellular communication system 100 comprising a base station 120, a plurality of mobile stations 130 and a plurality of terminals 140. System 100 may communicate with mobile stations 130 according to a conventional standard as mentioned above, whereas the base station deploys the above-mentioned communication to communicate with terminals 140.

From the plurality of terminals 140 system 100 may partition a first subset 310 of terminals 140a to 140d. In one embodiment these terminals may be gauging stations, which for example report a measured value to any further processing means via the radio communication system. These terminals may essentially exhibit a timing and/or frequency offset within the same predefined range, since they are all locally fixed and may deploy identical or comparable hardware. Furthermore terminals 140a-140d may be scheduled to report in an uplink message the measured values at the same time. Accordingly, after the base station received the uplink messages, a joint timing update message may be sent to that subset. Said timing update message for example may specify a time interval that instructs each terminal when to transmit the message. In one embodiment each terminal of the subset is configured and adapted to transmit the next uplink message after time interval, wherein the interval shall start when receiving said timing update message at each terminal. Alternatively each machine terminal may be adapted and configured to start the specified interval after having transmitted the last message. In this way one multicast timing update message may provide the information when to start the next uplink transmission.

Terminals 140e to 140g may be partitioned to form a second subset 320 of terminals. These terminals for example may be mobile machines configured and adapted to communicate via system 100, i.e. the mobile machines are configured and adapted to communicate with base station 120. In one embodiment the mobile machines may be fork lifters of a company. Typically these machines operate on the factory premises only, which typically is a confined area. Therefore the minimum and maximum radial distance of these terminals is limited. In the figure the limited range of the radial distance of a mobile terminal 140e-140g is illustrated by first radius 330-1 and second radius 330-2, which in turn limits the transmission delay as described above. To generate a movement profile the base station may track and record the timing offsets of a mobile station and then calculate the minimum and maximum timing offset of an uplink transmission to estimate a range of timing offset for each terminal of said subset or alternatively for the subset of terminals. Said estimated timing offset may then be used to assess a time span for receiving messages from these terminals. In this way the base station may generate and evaluate a movement profile to estimate a time span for receiving a message from the terminals of said subset.

In addition to sizing and allocating time spans 210 appropriately to enable asynchronous reception of uplink messages, the base station may allocate a bandwidth exceeding more than one adjacent resource unit of the resource grid used by system 100 in order to account for frequency inaccuracies of terminals and/or in order to intentionally enable a transmission using a bandwidth exceeding that of one resource unit. A base station may accordingly allocate a plurality of at least two resource units adjacent in frequency for a time span of at least two adjacent resource units adjacent in time.

FIG. 4 depicts a schematic of a multicast timing update message 400 sent by a base station to a subset of terminals.

The message comprises at least a common portion 410, which is received and processed by all terminals of the receiving subset.

The common portion may comprise the specification of a time interval specifying when to transmit a next message to the base station, wherein the time interval may start from the individual previous transmission of a terminal. In case the terminals do not transmit at the same time, i.e. transmissions of terminals are separated in time, this separation in time is maintained. In an alternative embodiment the specified time interval may start from the time of reception of the instructing message, thus specifying a simultaneous beginning of the time interval for all terminals receiving the message.

The common message portion may furthermore specify an identification of a plurality of terminals of the addressed subset of terminals, i.e. a subset of the subset. This can be achieved by addressing individual terminals of the subset, wherein the address may be of arbitrary format.

Optionally the common portion of the multicast message may comprise acknowledgement information, which informs all terminals of the addressed subset that a previous message has been received successfully. In case that an acknowledged message actually was not received successful, the base station may send an individual message portion to said terminal. However, since in most cases the previous uplink message has been received and processed successful by the base station, the acknowledgement will be correct, thus saving a plurality of individual acknowledgement messages.

Further optionally the common portion of the multicast message may specify an encryption key. If previous uplink messages have been transmitted in clear text, the specified encryption key enables the feature of encrypting a message while at the same time specifying the key to use. In one example the specification of a key can be an index to a predefined encryption key table, which has been provided to a terminal previously, for example upon installation of the terminal. In this way an encryption key can be specified without transmitting the key downlink in clear text. Furthermore, since the predefined encryption key tables in the subset of terminals may comprise different, individual encryption keys, the single message can specify to use a next key or a key located at a specified field of the table, wherein the terminals of the subset deploy different encryption keys for the encrypting the next transmission.

In another embodiment the common message portion may comprise common network control messages. In one embodiment said network control message may specify to set the individual clock one leap-second forward or that there is a $29^{th}$ February this year.

The common message portion may furthermore specify a common instruction that shall be performed by actuators of the addressed subset of terminals. The instruction may be any of the set of instructions that the terminals can perform. In one embodiment the instruction may specify to immediately stop all engines.

Optionally message 400 may comprise an address portion 420 that addresses at least one or more than one but not all terminals.

Each terminal of the addressed subset that receives the multicast message processes common message portion 410. Thereafter it receives and processes address portion 420. Said address portion advantageously is arranged in the message between common message portion 410 and an optional individual message portion 430. Said address portion may specify individual terminals, for which an individual message portion 430 is comprised in the remainder of the multicast message. Accordingly each terminal reads and processes the address portion of the multicast message and then either may stop receiving and processing the remainder of the message, in case said terminal is not addressed in the address portion, or the terminal may further receive and further process the remainder and the message portion addressed individually for that terminal. In this way a multicast message may comprise information dedicated for all terminals receiving said multicast message and in addition thereto may comprise an individual message portion 430.

According to the number of terminals addressed in the address portion of the multicast message, the multicast message may comprise a plurality of individual message portions 430. Each message portion 430 may comprise information specifying an individual terminal, which shall read and process said individual message portion.

An individual message portion 430 may provide instructions to the addressed individual terminal only, but does not address the residual terminals of the subset receiving the message. The individual instructions for example may provide further timing and/or frequency instructions, i.e. for example a time interval after which to send the next uplink message, wherein said time interval deviates from the time interval provided in common portion 410 to all terminals, or a frequency to use for transmission of the next uplink message. In this way the multicast message may provide particular information dedicated to at least one but not all terminals of the subset.

In another embodiment individual message portion 430 may comprise information that contradicts the corresponding information provided in the common message portion 410. Information and instructions provided in an individual message portion overrule corresponding information and/or instructions provided in the common message portion. In this way information and/or instructions provided in the common message portion can be amended for individual terminals. In an exemplifying embodiment the individual message portion may revoke the acknowledgement of a received uplink message and may at the same time specify an individual timing update that affects an individual terminal to repeat a transmission.

In this way the described method enables real-time asynchronous communication for terminals while at the same time saving timing update messages, i.e. so-called timing advance messages, to each individual terminal. Furthermore the proposed communication method enables the use of less complex and less costly hardware in the terminals.

Note that the method steps described above and performed by a base station may be performed by any network element of the communication system that is adapted and configured for scheduling resources of the available resource grid in a communication cell. Hence, in one alternative embodiment, a so-called radio network controller or a base station controller may perform at least part of the described method steps.

The invention claimed is:

1. A radio communication method for communicating between locally fixed base stations and terminals, where an available radio resource is divided into a grid of radio resource units, comprising the steps of:
    allocating at a base station a plurality of at least two blocks of radio resource units, each block of allocated radio resource units comprising at least two radio resource units consecutive in time; and
    at the base station, receiving a plurality of scheduled messages in the allocated plurality of at least two blocks of radio resource units, each message transmitted asynchronously in time or in frequency by one of a corresponding plurality of terminals;

measuring at least one of a timing offset from the beginning of the block of allocated radio resource units or a frequency offset of each of the messages;

determining a subset of at least two terminals having one of the timing offset within one predefined range or the frequency offset within one predefined range, the predefined range of timing offset exceeding the duration of one radio resource unit and the predefined range of frequency offset exceeding the frequency bandwidth of one radio resource unit; and transmitting a multicast message from the base station to the determined subset of at least two terminals.

2. The radio communication method of claim 1 wherein the multicast message provides at least one of timing information or frequency information to each of the terminals specifying when or on what frequency to transmit an uplink message.

3. The radio communication method of claim 2, wherein the provided timing information enables quasi real-time access.

4. The radio communication method of claim 2 further comprising the steps of allocating a block of radio resource units at the time and frequency corresponding to the provided timing or frequency information, and receiving an uplink message from at least one terminal of the subset at the time or frequency specified in the provided timing or frequency information.

5. The radio communication method of claim 1 wherein the multicast message comprises an acknowledge information addressing all terminals.

6. The radio communication method of claim 1 wherein the multicast message comprises information addressing only one terminal of the addressed subset of terminals.

7. The radio communication method of claim 1 wherein transmissions from the terminals of the subset exhibit the same periodicity.

8. A radio communication system comprising locally fixed base stations and terminals, and wherein an available radio resource is divided into a grid of radio resource units, wherein a base station comprises means for performing the steps of:

allocating at a base station a plurality of at least two blocks of radio resource units, each block of allocated radio resource units comprising at least two radio resource units consecutive in time or adjacent in frequency; and at the base station, receiving a plurality of scheduled messages in the allocated plurality of at least two blocks of radio resource units, each message transmitted asynchronously in time or in frequency by one of a corresponding plurality of terminals;

measuring at least one of a timing offset from the beginning of the block of allocated radio resource units or a frequency offset of each of the messages;

determining a subset of at least two terminals having one of the timing offset within one predefined range or the frequency offset within one predefined range, the predefined range of timing offset exceeding the duration of one radio resource unit and the predefined range of frequency offset exceeding the frequency bandwidth of one radio resource unit; and transmitting a multicast message from the base station to the determined subset of at least two terminals.

9. The radio communication system of claim 8 wherein the multicast message provides at least one of timing information or frequency information to each of the terminals specifying when or on what frequency to transmit an uplink message.

10. The radio communication system of claim 9 wherein the multicast message provides timing information enabling quasi real-time access.

11. The radio communication system of claim 8 wherein the base station further comprises means for performing the steps of allocating a block of radio resource units at the time or the frequency corresponding to the provided timing information or the provided frequency information respectively, and receiving an uplink message from at least one terminal of the subset at the time or frequency specified in the provided timing or frequency information.

12. The radio communication system of claim 8 wherein the multicast message comprises an acknowledge information addressing all terminals.

13. The radio communication system of claim 8 wherein the multicast message comprises information addressing only one terminal of the addressed subset of terminals.

14. The radio communication system of claim 8 wherein transmissions from the terminals of the subset exhibit the same periodicity.

* * * * *